Figure 1:
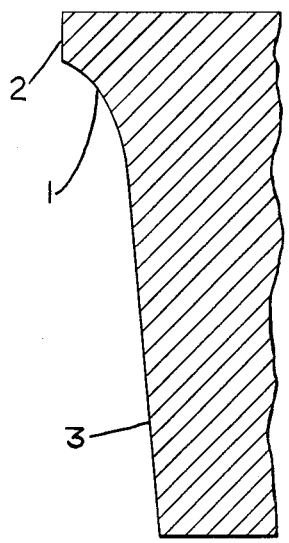

May 22, 1962 C. B. MILTON ET AL 3,035,947
METHOD OF FLAME MACHINING J-GROOVES
Filed Dec. 30, 1959 3 Sheets-Sheet 1

INVENTORS
CHARLES B. MILTON
DEWITT T. KELLEY
BY *William F. Mesinger*
ATTORNEY

May 22, 1962 C. B. MILTON ET AL 3,035,947
METHOD OF FLAME MACHINING J-GROOVES
Filed Dec. 30, 1959 3 Sheets-Sheet 2
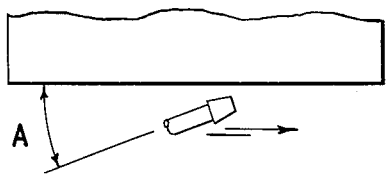
Fig. 4a.
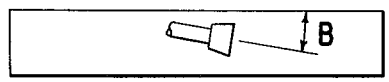
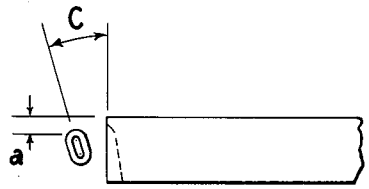
Fig. 4b.  Fig. 4c.
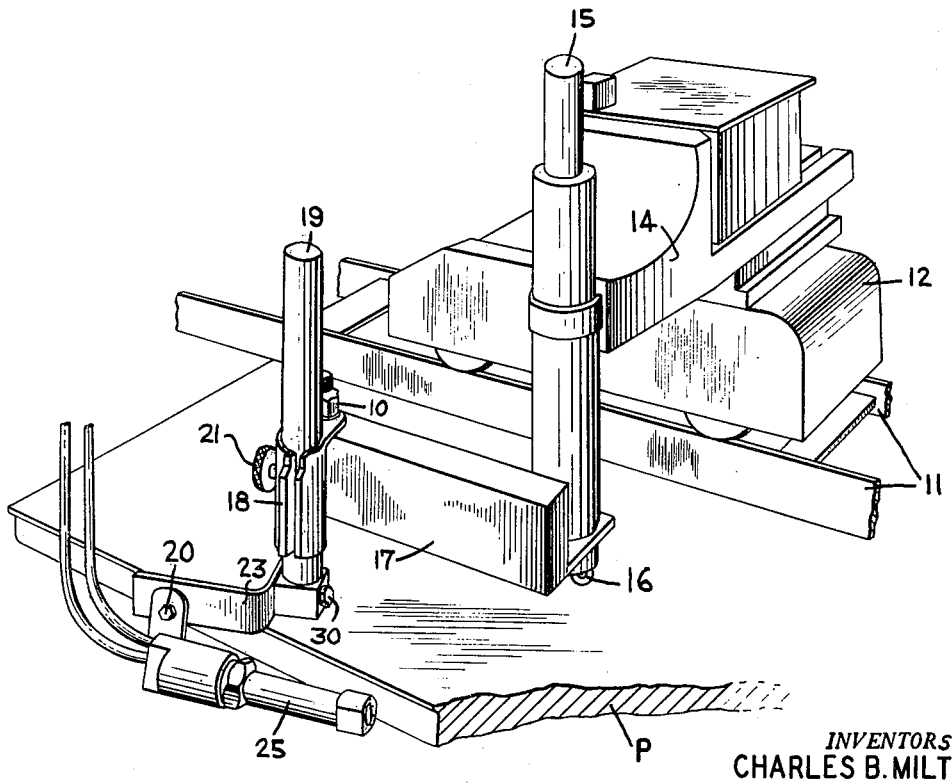
Fig. 5.
INVENTORS
CHARLES B. MILTON
DEWITT T. KELLEY
BY William F. Mesinger
ATTORNEY May 22, 1962     C. B. MILTON ET AL     3,035,947

METHOD OF FLAME MACHINING J-GROOVES

Filed Dec. 30, 1959     3 Sheets-Sheet 3

INVENTORS
CHARLES B. MILTON
DEWITT T. KELLEY

BY William F. Mesinger

ATTORNEY

United States Patent Office 3,035,947
Patented May 22, 1962

3,035,947
METHOD OF FLAME MACHINING J-GROOVES
Charles B. Milton, Matawan, and Dewitt T. Kelley, Nixon, N.J., assignors to Union Carbide Corporation, a corporation of New York
Filed Dec. 30, 1959, Ser. No. 862,905
6 Claims. (Cl. 148—9.5)

This invention relates to an improved method of plate edge preparation for welding operations and more particularly to a method of flame machining a J-groove in the edges of plates to be subsequently welded.

Basically, flame machining is a process whereby metal is thermochemically removed from the surface of a metallic body by applying an oxidizing gas stream obliquely against and progressively along successive portions of the metallic surface, which is at an ignition or kindling temperature, to form a contour therein.

In heavy steel fabrication, requiring the welding of plates of ½ inch or more thickness, it is customary to first prepare the plate edges to be welded to reduce the depth of welding heat penetration required. This plate edge preparation may take any of several forms, such as the single bevel, double bevel, single bevel and nose, double bevel and nose, and the J-groove. Of these several types of plate edge preparations, the J-groove is the most desirable from the welding standpoint since its contour permits a minimum expenditure of weld metal and welding time.

Flame machining of J-grooves on plates up to approximately 2 inches thick has been accomplished in the past using a two-pass method: (1) a bevel cut followed by (2) a gouging pass. This method has not been generally adopted, however, because of the inherent instability of the gouging operation. The only really successful J-grooving up to the present time has been accomplished by machine planing. From an economical standpoint, this method has serious disadvantages, such as (1) large capital expenditures for machines, (2) very low production rates and (3) continuously rising operating costs due to ever increasing labor costs.

The novel process of the invention described hereinafter provides for the first time a positive and accurate flame machining process for forming in a single pass, a uniformly smooth J-groove in relatively thick plate.

In order for a J-groove to be suited for subsequent welding operations the contour of the groove must be uniformly smooth. Ridges or any other unevenness of groove contour will cause uneven penetration or undercutting in subsequent welding operations which, in turn, will result in a poor quality weak-welded joint.

In addition, when making a weld any ridges in the J-groove contour will provide a place for any slag formed to accumulate and form undesirable inclusions. Also, in case of electric welding, it will frequently happen that the electric welding arc will arc across to the peaks of the ridges thereby resulting in inferior weld quality and possibly welding process stoppage.

Accordingly, it is the main object of this invention to provide a flame machining process whereby uniformly smooth J-grooves may be economically and simply produced. Other objects are to provide an improved method of making uniform J-grooves in a plate edge of relatively thick material with a single pass of an oxidizing gas stream, and for repetitively and rapidly producing J-grooves in the plate edges of material to be welded suitable for use either with a gas or electric welding process.

J-grooves produced according to the present invention are smooth and free from ridges or flutes. Such J-grooves are readily adaptable to subsequent welding operations and make for higher-quality sound welds. This result is accomplished by impinging at certain select angles a substantially flat laterally elongated oxidizing gas stream having a uniform velocity front, in a single pass, against a surface to be J-grooved.

Up until now it has been impossible to flame machine a substantially smooth J-groove of predetermined contour in thick metal plate. J-grooves were heretofore machine planed in thick plate. However, this method of J-grooving has several serious shortcomings. In addition to requiring large capital expenditures, machine planing was a slow laborious operation. For example, in order to machine plane a J-groove in cylinders having a 2⅝ inch thick wall and an internal diameter of 5 feet, it required 8 hours from the time the groove was started until the time it was completed. In marked contrast to this, a J-groove was made in a similar cylinder by the method of the invention in only 4 minutes. Additionally, grooves produced by the process of the invention are highly smooth-surfaced J-contoured grooves which enable welding operators to visually detect any defects in the plate before making the welded joint. In cases where a defect is found, the operator will repair or eliminate the surface defect before making the weld. On the other hand, surfaces produced by machine planing made it difficult to detect any defects in the plate surface. As a consequence, a welding operator frequently would make a weld that failed to meet X-ray weld quality necessary especially in cases where the welds are made in pressure vessels. The result was that the weld had to be gouged out and a new weld made.

J-grooves made according to the method of the invention substantially minimize the chance of making a weld in plate having a defect at the surface to be joined.

Figure 2:
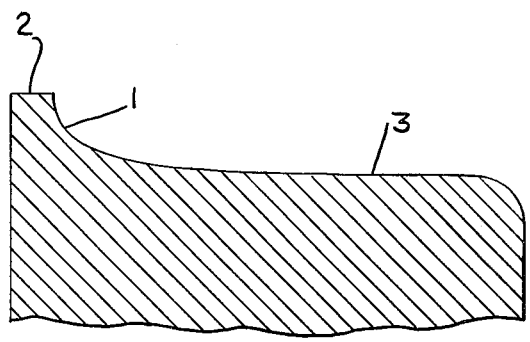
Figure 3:
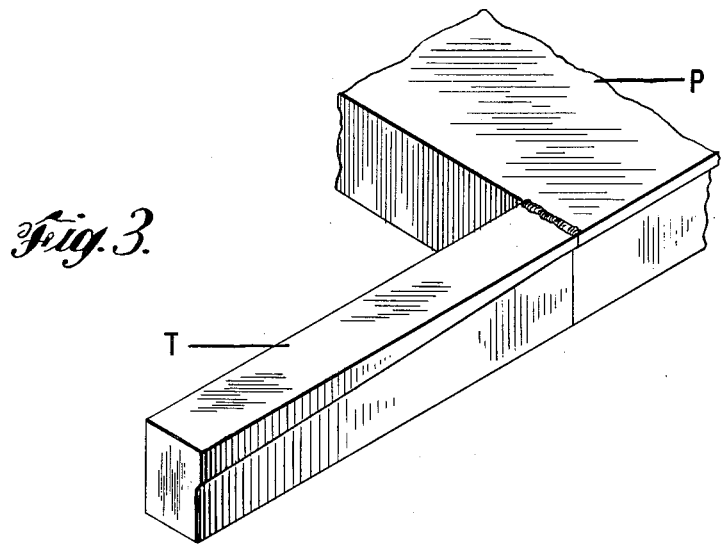
Figure 6A:
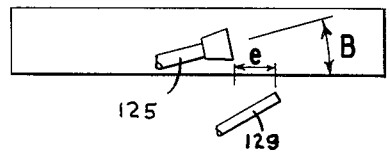
Figure 6B:
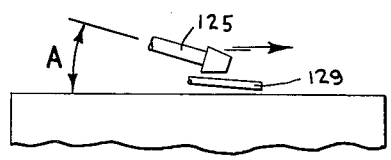
Figure 6C:
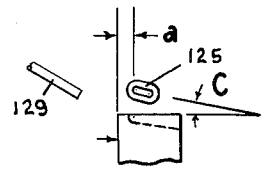
Figure 7:
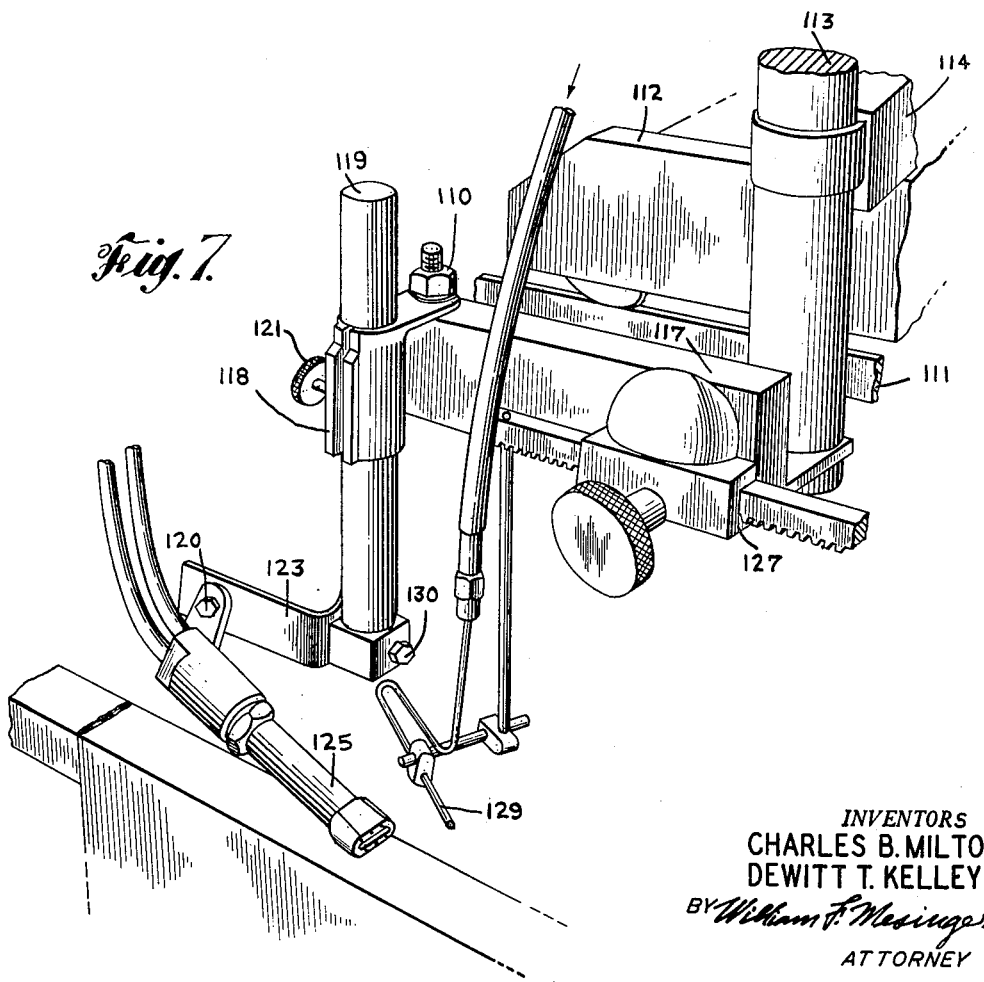

In the drawings:
FIGURES 1 and 2 are views of plate edge cross sections showing the contour of typical J-grooves made according to the invention;
FIGURE 3 is a perspective view of a starting tab attached to a plate;
FIGURES 4a, 4b and 4c schematically show plan, side and end views of the critical dimensional positioning of the nozzle for horizontal J-grooving;
FIGURE 5 is a perspective view of an apparatus for carrying out the invention with nozzle positioned for horizontal J-grooving;
FIGURES 6a, 6b and 6c schematically show plan, side and end views of the critical dimensional positioning of the nozzle and air jet for vertical J-grooving; and
FIGURE 7 is another perspective view of the apparatus with nozzle positioned for carrying out vertical J-grooving.

In order to best fulfill the requirements for subsequent welding operations, the J-groove produced should have a form similar to that shown in FIGURES 1 and 2; that is, a radius 1 at the base or nose section 2 of the J-groove and a groove side angle or taper 3 between about 0 degrees and 12 degrees. In addition, the side of the groove must be uniformly smooth for its entire length.

J-grooves of the above-described type are produced according to the present invention by preheating a surface of a plate in which a J-groove is to be produced and then impinging a laterally elongated oxidizing gas stream having a uniform velocity front against the surface to be J-grooved and controlling the impingement of the uniform velocity front of the oxidizing gas stream against such surface.

More particularly, it has been found that in order to obtain J-grooves of the quality and dimension desired several important operating conditions must be controlled and maintained in carrying out the invention. While these operating conditions are not "super-critical" in that small deviations can be tolerated, any such deviation will result in a corresponding variation in the groove contour and/or depth. Excessive deviations will result in a J-groove unsuitable for welding.

These operating conditions are; first, the preheat must be sufficient to rapidly raise the metal being treated to its ignition temperature;

Second, the nozzle impinging angle A (see FIGS. 4a and 6b), which determines the angle at which the oxygen stream impinges the work surface, must be set within the range of about 10 to 25 degrees and preferably from about 15 to 20 degrees. If this angle is too small, that is, much less than 10 degrees, the reaction zone is too far ahead of the nozzle and the cut is lost. Also, the value of the preheat is lost. If this angle is too large, there is a tendency for the impinging oxygen stream to cause backwash of molten metal and slag resulting in a rough finished surface. FIGURES 4a, 4b. 4c and 6a, 6b, 6c illustrate more clearly the preferred nozzle angles for horizontal and vertical plate, respectively.

Third, nozzle lateral angle B, illustrated in FIGURES 4b and 6a must be adjusted between about 0 degrees and 8 degrees and preferably from about 2 degrees to about 4 degrees so as to compensate for the expanding oxygen stream. Thus, the nozzle is always directed slightly away from the nose section or base of the J-groove. Were the nozzle to be parallel, for example, to the top of a horizontally positioned plate, the expanding oxygen stream might destroy the nose section or result in an over-large radius at the base of the J-groove. This adjustment permits the desired radius at the base of the J-groove to be obtained.

Fourth, slot angle C, which is the angle formed between the long side of the nozzle slot and the face of the plate edge as shown in FIGS. 4c and 6c, determines the degree of taper of the J-groove side wall. This degree of taper is desirably between about 0 degrees and 8 degrees. To achieve this taper, the slot angle should be set between about −4 and 10 degrees and preferably between about 0 degrees and 8 degrees.

Fifth, slot distance $a$, as shown in FIGS. 4c and 6c, controls the width of the nose section left on the plate edge after J-grooving. The thickness of this nose section is optional depending upon the welding conditions desired, but it is normally between 3/16 inch and 5/16 inch thick, depending on the thickness of the plate. Therefore, the slot distance adjustment establishes the thickness of the nose section.

Sixth, cutting oxygen flow must be correlated with the plate thickness and nozzle size used such that the velocity front or profile of the oxygen stream issuing from the nozzle slot is substantially even across the width of the stream. If the velocity of the oxygen is not uniform across the width of the stream, the side wall of the J-groove will not be uniformly smooth due to the uneven reaction.

Seventh, cutting speed, that is the speed with which the nozzle traverses the plate edge, must be constant and accurately controlled since this largely controls the contour depth of the J-groove. To obtain a predetermined contour depth, there must be close correlation between cutting speed and oxygen flow. For example, for a given nozzle size, there is a fairly narrow range of oxygen flow rates which will produce an oxygen stream having the required uniform velocity profile. This oxygen flow rate then determines the optimum cutting speed to achieve the desired J-groove contour depth. Increasing the speed results in a shallower contour depth, decreasing the speed results in a deeper J-groove contour. If this speed is set too low, the plate edge will be gouged severely; at an excessive speed the grooving reaction will be lost.

In practicing the method of the invention, a nozzle is selected which is capable of providing a substantially flat laterally elongated oxygen stream having a uniform velocity front across its width. Nozzles admirably suited for carrying out the invention are of the Linde SL-30, SL-87, SL-61, SL-81, and SL-48 types, which are preferably similar to the construction in U.S. Patents 2,290,295 and 2,353,318.

Also the width of the oxygen stream is correlated with plate edge thickness wherein the J-groove is to be made. For example, referring to Table I below, which contains preferred operating conditions for various thicknesses of plate to be J-grooved, if a J-grove is to be made in 2 inch thick plate a nozzle having a slot width of about 1 inch should be employed. Then, continuing this example, before the preheat and cutting gases are turned on the nozzle is properly positioned by setting the impingement angle to 18 degrees, the lateral angle to 4 degrees, the slot angle to 4 degrees and the slot distance at ½ inch. Next the cutting speed is selected which, at the oxygen flow rate (1850 c.f.h.) producing the required uniform velocity front with this nozzle, will result in a J-groove having the desired contour depth. Again for this example, this cutting speed is 24 i.p.m. Once the nozzle settings are made, the nozzle is so placed so as to provide a minimum clearance between the nozzle and the plate edge.

*Table 1*

| Plate, Inches | Nozzle, Type | Nozzle Slot Width, Inches | Cutting Oxygen, c.f.h. | Speed, i.p.m. | Impinging Angle "A", Degrees | Lateral Angle "B", Degrees | Slot Angle "C", Degrees | Slot Distance "a", Inches |
|---|---|---|---|---|---|---|---|---|
| HORIZONTAL PLATE | | | | | | | | |
| 1½ | SL-30 | .562 | 1,650 | 44 | 15 | 4 | 2 | 7/16 |
| 2 | SL-48 | 1.000 | 1,850 | 24 | 18 | 4 | 4 | ½ |
| 2½ | SL-61 | 1.234 | 4,300 | 40 | 18 | 4 | 4 | 5/8 |
| 3 | SL-81 | 2.125 | 5,000 | 27 | 15 | 2 | 4 | ½ |
| 3½ | SL-81 | 2.125 | 5,000 | 27 | 15 | 2 | 4 | ½ |
| 4 | SL-87 | 2.406 | 7,000 | 27 | 18 | 2 | 8 | 1 |
| VERTICAL PLATE | | | | | | | | |
| 1½ | SL-30 | .562 | 1,450 | 57 | 20 | 3 | 4 | ¼ |
| 2 | SL-48 | 1.000 | 1,850 | 36 | 18 | 2 | −2 | 7/16 |
| 2½ | SL-61 | 1.234 | 4,300 | 40 | 18 | 4 | 4 | ½ |
| 3 | SL-81 | 2.125 | 5,000 | 27 | 15 | 2 | 4 | ½ |
| 3½ | SL-81 | 2.125 | 5,000 | 25 | 17 | 3 | 2 | 5/8 |
| 4 | SL-87 | 2.406 | 7,000 | 30 | 18 | 4 | 4 | ½ |

The abovementioned nozzles have a characteristic slot-like discharge orifice having flat upper and lower surfaces. This type orifice provides a ribbon-like oxygen stream at the nozzle exit face, that is, an oxygen stream similar to a ribbon of substantial thickness having non-parallel edges since the oxygen stream continues to expand in width as it leaves the nozzle. The centerline of the oxygen stream discharged from the nozzle coincides with the longitudinal axis of the nozzle. The transverse axis of the oxygen stream coincides with the long axis of the nozzle slot. With this relationship between nozzle and oxygen stream it is obvious that by setting the nozzle angles, the angle between the oxygen stream and work are also set. Thus according to the method of the invention a J-groove having a nose section or base, a side wall and a curved section between said base and said side wall is formed by preheating said surface to ignition temperature and providing an elongated oxidizing gas stream having a longitudinal centerline and a transverse axis to thermochemically remove metal from said preheated surface to be J-grooved. The direction of the so provided oxidizing gas stream is then controlled by the three separate angles between said stream and the work. First, the oxidizing gas stream impinges the preheated surface at an acute angle of impingement. Secondly such acutely impinging oxidizing gas stream is directed so that the projection of the centerline thereof on the surface to be J-grooved forms a lateral angle with the edge of the nose section or base of the J-groove. A third angle is formed between said oxidizing gas stream and said surface to be J-grooved by inclining the oxidizing gas stream at a slot angle formed between said surface to be J-grooved and the transverse axis of the oxidizing gas stream. In addition to the three above described angles in order to form the J-grooves by the method of the invention one edge of the oxidizing gas stream must be spaced from an edge of the work surface to form the nose section of the J-groove. Also the oxidizing gas stream must have a uniform velocity front across the face thereof when such stream impinges the surface. The uniform velocity front is correlated with the relative motion between the oxidizing gas stream and the work to insure uniformly smooth J-contoured grooves.

When starting a J-grooving pass, there is a distance before the groove actually assumes its final depth and contour. Therefore, in order to ensure having a uniform groove for the full length of the plate edge, it is necessary to use a starting tab T, as illustrated in FIG. 3. The starting tab T, lightly tack welded to the edge of the plate P, is of sufficient length to ensure that a full depth groove is being made before the plate itself is reached. A length of approximately 12 to 18 inches, depending on plate thickness, is admirably suited to this purpose. Once the J-groove is completed, the starting tab is easily removed.

When the nozzle is in the correct position relative to the plate edge, the preheats are set to the maximum stable flames and the edge of the starting tab preheated until molten. The cutting oxygen is then turned on to deliver the appropriate flow thereby producing the uniform velocity front necessary for successful J-grooving. The propelling machine is then started in motion at a constant speed to complete the J-groove.

The same basic process steps are employed whether one is J-grooving horizontal or vertical plate. FIGURE 7 shows apparatus suitable for vertical J-grooving. The angles and slot distance remain relative to the plate and are independent of the plate's orientation. The one difference is that when J-grooving vertical plates an air jet 129 is necessary for slag removal. When J-grooving horizontal plate, gravity pulls the molten slag down and away from the nose section. On vertical plate, the air jet takes over for the lack of gravity in moving the slag. The positioning of the jet mounted on the nose section side of the plate is not critical. Its downward angle, however, should be approximately the same as the nozzle's impinging angle. The air stream should blow at a slight angle, approximately 15 degrees, across the edge of the plate and should impinge directly on the nose section corner of the plate edge. The distance e (see FIG. 6a) of the front of the air jet nozzle ahead of the face of the nozzle should be such that the air stream engages the slag puddle slightly ahead of the reaction zone. The air stream will then be far enough ahead of the nozzle so as not to interfere with the reaction but close enough to the nozzle to keep the slag from flowing over the nose section. If the slag flows are not held in check the "nose" might be burned away or an excessive radius at the base of the J-groove result.

Apparatus suitable for practicing the inventive method of J-grooving a plate in the horizontal position is shown in FIGURE 5. Referring to FIGURE 5, a carriage 12 is mounted on parallel tracks 11 for movement in a longitudinal direction. Associated with carriage 12 is an electronic governor (not shown) for controlling the speed of said carriage. Carriage 12 has mounted thereon an overhanging member 14 to which is slidably attached a vertical plate follower shaft 15. At the bottom of the follower shaft 15 is a plate follower wheel 16. The plate follower shaft 15 is an integral part of the apparatus and provides the mounting for the nozzle positioning device. By this arrangement, the follower wheel 16 attached to shaft 15 permits the processing of plate P not in a true plane by compensating for contours in the plate itself. Mounted on the shaft 15 is a longitudinal member 17 which has swivelably fastened thereto a gear clamp 18 which cooperates with a rack (not shown) on tubular member 19 for moving such member up or down. The gear and rack arrangement is actuated by a knob-handle 21. Pivotally mounted at the bottom of tubular member 19 is mounting bracket 23 to which the nozzle 25 is movably attached.

The nozzle 25 is of the slotted oxygen orifice type such as the Linde SL-30, SL-61 and SL-87 which are described in detail in U.S. Patents 2,353,318 and 2,290,295. The choice of nozzle size is, of course, dependent upon gas flows required for various plate thicknesses.

In preparing to make a J-groove according to the method of the invention adjustments are made in the impingement angle by pivoting the rack and gear arrangement about the nut and bolt at 10, to the nozzle lateral angle by swinging the nozzle about the bolt at 20, to the slot angle by pivoting the nozzle assembly about nut and bolt 30 and to the slot distance by raising or lowering the nozzle by means of the knob 21 on the gear and rack clamp.

In a similar manner FIGURE 7 illustrates one form of apparatus for carrying out the method of the invention on plate in the vertical position. Referring to FIGURE 7 wherein similar items of apparatus are designated by similar reference characters with the addition of 100 to the reference characters of FIGURE 5, a carriage 112 is mounted on tracks 111 for movement in a longitudinal direction. Carriage 112 has mounted thereon an overhanging member 114 to which is fixed a shaft 113. Fixed to the bottom of shaft 113 is a longitudinal member 117 which has swivelably fastened thereto a clamp 118. A shaft 119 is secured to clamp 118. Pivotally mounted at the bottom of the shaft 119 is mounting bracket 123 to which is movably attached a nozzle 125. Also provided on longitudinal member 117 is a gear and rack arrangement 127 to which is fixed an air jet 129. In this case adjustments are made in the impingement angle by pivoting the nozzle about nut and bolt 120, in the nozzle lateral angle by swinging the nozzle about nut and bolt 110, in the slot angle by pivoting the nozzle assembly about nut and bolt 130.

While apparatus described and illustrated in FIGURES 5 and 7 are suitable for carrying out the method of the invention, it is to be understood that the invention is in no way limited to the apparatus shown and that the invention may be carried out with any apparatus which is conveniently adaptable for performing the method.

In order that a person skilled in the art may more fully understand the method of the invention, the following example is included.

A uniformly smooth J-groove was made in 4 inch thick low carbon steel plate by employing a Linde SL-87 nozzle positioned at an impingement angle of 18 degrees, a lateral angle of 2 degrees, a slot angle of 8 degrees and a slot distance of one inch measured from the nose edge of the surface to be J-grooved to the near end of the nozzle slot. Seven thousand c.f.h. of cutting oxygen were passed through the nozzle to produce a uniform velocity front across the oxygen stream width. The stream traversed the plate edge at a constant speed of 27 inches per minute. The resulting J-groove was remarkably smooth in contour and admirably suited to subsequent welding operations.

As a further example of the invention a vertical J-groove was made in a heavy wall pressure vessel, having a semicircular half-shell shape. In such case, it is advantageous to cut and J-groove the half-shell while lying with its longitudinal axis horizontal and its edges turned vertically upward. In this example the half-shell was 30 feet long and had a wall thickness of 4 inches. A Linde SL-87 nozzle was positioned so that the impingement angle was 18 degrees, the lateral angle was 4 degrees, the slot angle was 4 degrees and the slot distance was ½ inch measured from the nose edge of the surface to be J-grooved and the near end of the slot of the nozzle. Cutting oxygen at 7000 c.f.h. flow was delivered to produce a flat elongated oxygen stream having a uniform velocity front. An air jet was positioned adjacent the oxygen stream and directed to deliver a stream of air to the surface to be J-grooved so as to keep the slag from running over the nose section or base. The resulting J-groove had an unusually smooth surface and excellent contour which permitted a sound weld having a uniform penetration to be subsequently made.

While the invention has been described in detail as applicable to any metal that can be oxygen cut, it is to be understood that the same basic process is applicable to metals which require the addition of powder to the oxygen reaction zone for successfully removing metal therefrom.

Since it is obvious that minor variations might be made in the above-described invention without departing from the spirit thereof, it is to be understood that the invention is not limited thereto except as set out in the appended claims.

What is claimed is:

1. A process for forming a J-groove, consisting of a nose section or base, a side wall and a curved section between said base and said side wall, in a surface of a metal body, which comprises preheating said surface to be J-grooved to ignition temperature, providing a substantially flat laterally elongated oxidizing gas stream having a longitudinal centerline and a transverse axis to thermochemically remove metal from said preheated surface to be J-grooved, impinging said elongated oxidizing gas stream against said preheated surface at an acute angle, directing said acutely impinging oxidizing gas stream such that the projection of the centerline thereof onto the surface to be J-grooved is at a lateral angle to the edge of said nose section or base of said J-groove to be formed to obtain the desired curved section between said base and said side wall, inclining said substantially flat laterally elongated oxidizing gas stream at an angle formed between said surface to be J-grooved and the transverse axis of said oxidizing gas stream to obtain said side wall, spacing one edge of said substantially flat laterally elongated oxidizing gas stream from an edge of said preheated surface to form the nose section or base of said J-groove, causing such oxidizing gas stream to have a uniform velocity front across the face thereof when such stream impinges said surface to provide a uniformly smooth J-contoured groove, progressively providing relative motion between said oxidizing gas stream and said surface to be J-grooved at a substantially constant speed and correlating said cutting speed with said uniform velocity front thereby producing a J-groove of predetermined uniformly smooth contour depth with a single pass of said oxidizing gas stream.

2. A process according to claim 1 wherein the angle of impingement is from about 10 to 25 degrees, said lateral agle is between about 0 to 8 degrees, and the angle between the surface to be J-grooved and the transverse axis of the oxidizing gas stream is from about −4 to 10 degrees.

3. A process according to claim 1 wherein the angle of impingement is from about 15 to 20 degrees, said lateral angle is between about 2 to 4 degrees and the angle between the surface to be J-grooved and the transverse axis of the oxidizing gas stream is from about −2 to 8 degrees.

4. A process according to claim 1 wherein powder is provided in combination with an oxidizing gas to form a J-contoured groove in a refractory metal plate.

5. A process for forming a J-groove, consisting of a nose section or base, tapered side wall and a curved section between said base and said tapered side wall, in a surface of a metal body, which comprises preheating said surface to be J-grooved to ignition temperature, providing a substantially flat laterally elongated oxygen gas stream having a longitudinal centerline and a transverse axis against said preheated surface at an acute angle, directing said acutely impringing oxygen gas stream such that the projection of the centerline thereof onto the surface to be J-grooved is at a lateral angle to the edge of said nose section or base of said J-groove to be formed to obtain the desired curved section between said base and said tapered side wall, inclining said substantially flat laterally elongated oxygen gas stream at an angle formed between said surface to be J-grooved and the transverse axis of said oxygen gas stream to obtain said tapered side wall, spacing one edge of such substantially flat laterally elongated oxygen gas stream from an edge of said preheated surface to form the nose section or base of said J-groove, causing such oxygen gas stream to have a uniform velocity front across the face thereof when such stream impinges said surface to provide a uniformly smooth J-contoured groove, progressively providing relative motion between said oxygen gas stream and said surface to be J-grooved at a substantially constant speed and correlating said cutting speed with said uniform velocity front thereby producing a J-groove of predetermined uniformly smooth contour depth with a single pass of said oxygen gas stream.

6. A process for forming a J-groove, consisting of a nose section or base, a side wall and a curved section between said base and said side wall, in a surface of a metal body, which comprises preheating said surface to be J-grooved to ignition temperature, providing a substantially flat laterally elongated oxidizing gas stream having a longitudinal centerline and a transverse axis to thermochemically remove metal from said preheated surface to be J-grooved, impinging said elongated oxidizing gas stream against said preheated surface at an acute angle, directing said acutely impinging oxidizing gas stream such that the projection of the centerline thereof is at a lateral angle to the edge of said nose section or base of said nose of said J-groove to be formed to obtain the desired curved section between said base and said tapered side wall, inclining said substantially flat laterally elongated oxidizing gas stream at an angle formed between said surface to be J-grooved and the transverse axis of said oxidizing gas stream to obtain said tapered side wall, spacing one edge of said substantially flat laterally elongated oxidizing gas stream from an edge of said preheated surface to form the nose section or base of said J-groove, causing such oxidizing gas stream to have a uniform velocity front across the face thereof when such stream impinges said surface to provide a uniformly smooth J-contoured groove, progressively providing relative motion between said oxidizing gas stream and the surface to be J-grooved at a substantially constant speed, correlating said cutting speed with said uniform velocity front and providing an air jet adjacent said oxidizing gas stream to impinge the molten metal being removed and so keep such metal from flowing over the nose section.

References Cited in the file of this patent

UNITED STATES PATENTS

| | | |
|---|---|---|
| 2,125,180 | Serner | July 26, 1938 |
| 2,125,182 | Jacobsson et al. | July 26, 1938 |
| 2,266,834 | Walker et al. | Dec. 23, 1941 |
| 2,290,295 | Scheller | July 21, 1942 |
| 2,664,368 | Babcock et al. | Dec. 29, 1953 |

OTHER REFERENCES

Oxygen Cutting, by Slottman and Roper, first edition, published by McGraw-Hill Book Co., Inc., New York, 1951, pages 180 and 181.

The Oxy-Acetylene Handbook, by the Linde Air Products Co., New York, N.Y., 1947, pages 421 and 422.